H. R. STICKNEY.
GAS ENGINE.
APPLICATION FILED JUNE 6, 1910.

982,394.

Patented Jan. 24, 1911.

Witnesses:
Eleanor W. Dennis.
Riley M. Andrews.

Inventor:
Henry R. Stickney
by S. W. Bates
Atty.

UNITED STATES PATENT OFFICE.

HENRY R. STICKNEY, OF PORTLAND, MAINE.

GAS-ENGINE.

982,394.  Specification of Letters Patent.  Patented Jan. 24, 1911.

Application filed June 6, 1910. Serial No. 565,230.

*To all whom it may concern:*

Be it known that I, HENRY R. STICKNEY, a citizen of the United States of America, and a resident of Portland, in the county of Cumberland, State of Maine, have invented certain new and useful Improvements in Gas-Engines, of which the following is a specification.

My invention relates to a gas engine and it relates particularly to various improvements connected with the closed cylinder trunk engine patented by me July 14, 1891, No. 455,775 whereby the same has been adapted to be used as a gas engine.

In the accompanying drawing, I illustrate a two cycle, three port engine constructed according to the patent referred to and embodying the features of my present invention.

Figure 1:
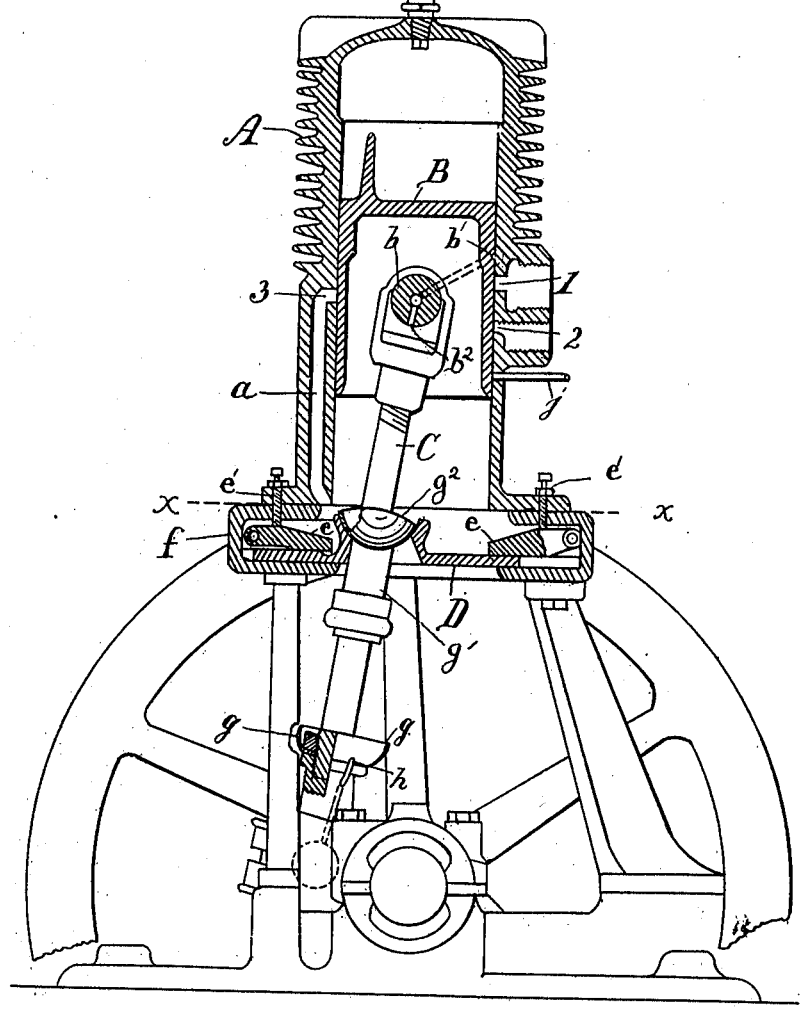
Figure 2:
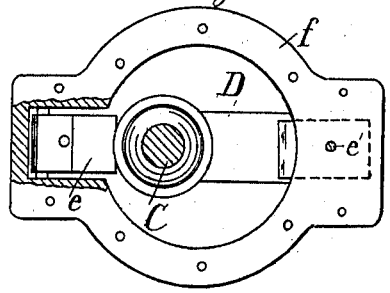

In the drawing, Figure 1 represents a central vertical section with certain parts in elevation, and Fig. 2 is a section on the line *x x* of Fig. 1.

A represents the cylinder which is corrugated to provide for air cooling.

B is the trunk piston, $b$ the pin which is made hollow to receive the lubricating oil and C is the piston rod. In the lower portion of the hollow pin is an outlet duct $b^2$ for allowing the oil to drip downward as hereinafter set forth.

D represents the sliding plate or diaphragm as shown in my prior patent and $g'$ is the rocking gland which makes the connection between the piston and the slide D.

$g^2$ is the spherical enlargement which is here shown as hollow or cap-shaped to retain the oil and which fits a corresponding recess in the slide.

Means are provided for taking up the wear of the plate as it wears in use. For this purpose, I make use of a gib $e$ at each end of and above the slide, each gib being pivoted at its outer end with its inner end resting on the upper surface of the plate. The gib is held down against the plate D by means of an adjusting screw $e'$ which passes down through the top of the hollow chamber $f$ formed beyond the walls of the cylinder and the screw presses on the top of the gib. The hollow chamber or extension $f$ in which the slide is contained, extends out beyond the walls of the cylinder so that the adjusting screw which regulates the tension on the gib will be accessible from the outside.

1 represents the exhaust port, 3 the inlet port through which the compressed explosive passes into the explosion chamber and 2 the inlet port through which the mixture is introduced into the lower part of the cylinder proper.

One of the important features of my engine is the means of lubricating by which the oil introduced through the pipe $j$ lubricates the piston, thence works through a groove $b'$ to the hollow pin $b$ whence it runs down the piston rod C, through the gland $g'$ and is caught in an annular cup $g$ surrounding the lower end of the piston rod. From this cup it is finally conducted by a suitable duct $h$ to the crank pin. Thus the lubricating oil introduced at the piston lubricates the piston, the connecting pin, the gland and finally the crank pin, without introducing it at any other points.

The operation of my engine is the same as any two or three port two cycle gasolene engine.

As already pointed out the lubricating oil after lubricating the piston runs down the piston rod and lubricates the crank pin and has no chance to form an oil spray to mix with the charge.

The pivoted gibs are readily made to bear with a uniform pressure on the slide, the adjustment being entirely outside the engine.

The improvements specified are important and add greatly to the efficiency of my engine in many practical ways.

The greater portion of the oil remains in the lower portion of the cylinder and works into the bearing surfaces of the slide enough following down the piston rod to effect the lubrication of the crank pin.

It will be seen that the cylinder is lubricated by the direct application of the oil and that there is no oil spray passing into the cylinder with the mixture as in the case of engines containing oil in their crank casing. Thus the excessive lubrication and carbonizing of the cylinder is prevented, the spark plug does not become foul and the engine requires little attention.

I claim:—

1. In a trunk engine, the combination of a cylinder, a piston therefor, a sliding plate at the lower end of said cylinder for closing the end thereof, a gland in said sliding plate pivotally connected therewith, a piston rod passing through said gland, a gib at each end of said sliding plate, each gib being pivoted at its outer end and having its inner end resting on said sliding plate and a set screw for forcing said gib against the top of said sliding plate.

2. In a trunk engine, the combination of a cylinder having at its lower end a hollow chamber extending laterally beyond the walls of the cylinder, a piston in said cylinder, a sliding plate in the bottom of said chamber for closing the lower end of the cylinder, a gland in said sliding plate and pivotally connected therewith, a piston rod passing through said gland, a gib pivoted at its outer end above each end of said sliding plate, the free end of said gib resting on top of said sliding plate and a set screw extending through the top of said chamber outside of said cylinder and impinging on said gib to adjust the tension on said sliding plate.

In witness whereof I have hereunto set my hand this 12th day of May, 1910.

HENRY R. STICKNEY.

Witnesses:
S. W. BATES,
ELEANOR W. DENNIS.